United States Patent
Lilja et al.

(10) Patent No.: US 9,138,698 B2
(45) Date of Patent: Sep. 22, 2015

(54) IMPELLER FOR MIXING SLURRY IN METALLURGICAL PROCESSES

(75) Inventors: Launo Lilja, Pori (FI); Jari Tiihonen, Pori (FI); Bror Nyman, Vanha-Ulvila (FI); Tuomas Hirsi, Helsinki (FI); Jussi Vaarno, Sundsberg (FI); Jouko Peräaho, Uusikaupunki (FI)

(73) Assignee: OUTOTEC OYJ, Espoo (FI)

( * ) Notice: Subject to any disclaimer, the term of this patent is extended or adjusted under 35 U.S.C. 154(b) by 950 days.

(21) Appl. No.: 13/254,488

(22) PCT Filed: Mar. 1, 2010

(86) PCT No.: PCT/FI2010/050157
§ 371 (c)(1),
(2), (4) Date: Nov. 1, 2011

(87) PCT Pub. No.: WO2010/103172
PCT Pub. Date: Sep. 16, 2010

(65) Prior Publication Data
US 2012/0039721 A1 Feb. 16, 2012

(30) Foreign Application Priority Data

Mar. 11, 2009 (FI) ..................................... 20090089

(51) Int. Cl.
*B01F 7/22* (2006.01)
*B01F 7/00* (2006.01)

(52) U.S. Cl.
CPC ..... *B01F 7/00341* (2013.01); *B01F 2215/0075* (2013.01); *B01F 2215/0422* (2013.01); *Y10T 29/49316* (2015.01)

(58) Field of Classification Search
CPC ................ B01F 7/06; B01F 7/20; B01F 7/22; B01F 7/00366; B01F 7/00375; B01F 7/00341; B01F 7/00275; B01F 7/00383; B01F 2215/042; B01F 2215/0075; Y10T 29/49316
USPC ....................... 366/65, 66, 270, 330.1–330.7, 366/325.92–325.93; 416/237; 422/224–228; 261/84, 91
See application file for complete search history.

(56) References Cited

U.S. PATENT DOCUMENTS 2,148,555 A * 2/1939 Hicks ............................. 416/202
5,052,892 A * 10/1991 Fasano ...................... 416/204 R (Continued)

FOREIGN PATENT DOCUMENTS

| EP | 1588758 A1 * | 10/2005 | ............. B01F 15/00 |
| FR | 1600744 A * | 7/1970 | |
| WO | 2013/124539 A1 * | 8/2013 | |

OTHER PUBLICATIONS

*International Search Report (PCT/ISA/210) issued on May 28, 2010, by Finnish Patent Office as the International Searching Authority for International Application No. PCT/FI2010/050157.

*Primary Examiner* — Charles Cooley
(74) *Attorney, Agent, or Firm* — Buchanan, Ingersoll & Rooney PC

(57) ABSTRACT

The invention relates to a turbine-type high-power impeller, to be used for mixing slurry in hydrometallurgical process reactors. The impeller is formed of at least five blades, each of which blades comprises a front edge, trailing edge, root and tip; the roots of the impeller blades are permanently attached by a joint to the hub or axis of the impeller, so that the front edge of the impeller blade is straight, and the trailing edge is chamfered, in which case the blade is narrowed towards the tip, and the blade is provided with two longitudinal folds arranged in parallel with the front edge of the blade.

15 Claims, 4 Drawing Sheets

(56) References Cited

U.S. PATENT DOCUMENTS

| | | | |
|---|---|---|---|
| 5,988,604 A * | 11/1999 | McWhirter | 261/91 |
| 6,877,959 B2 * | 4/2005 | McWhirter | 416/228 |
| 7,114,844 B2 * | 10/2006 | Weetman | 366/328.3 |
| 7,172,337 B2 * | 2/2007 | Roszczenko et al. | 366/270 |
| 7,296,925 B2 * | 11/2007 | Himmelsbach et al. | 366/330.3 |
| 7,374,333 B2 * | 5/2008 | Eisenkraetzer et al. | 366/330.3 |
| 8,220,986 B2 * | 7/2012 | Janz et al. | 366/330.3 |
| D681,690 S * | 5/2013 | Xia et al. | D15/29 |
| 2005/0243646 A1 * | 11/2005 | Eisenkraetzer et al. | 366/330.3 |
| 2010/0124147 A1 * | 5/2010 | Janz et al. | 366/343 |
| 2012/0039721 A1 * | 2/2012 | Lilja et al. | 416/241 R |
| 2015/0044057 A1 * | 2/2015 | Dinnison | 416/237 |

* cited by examiner

IMPELLER FOR MIXING SLURRY IN METALLURGICAL PROCESSES

FIELD OF INVENTION

The invention relates to a turbine-type high-power impeller to be used for mixing slurry in hydrometallurgical process reactors.

BACKGROUND OF INVENTION

The invention relates to an impeller that is generally used in reactors in hydrometallurgical processes.

The impeller of the invention is meant to be used for the same purpose as the straight-bladed impeller conventionally used in the field, and certain other energy-efficient impellers known in the field. The impeller of the invention can be used for example in large-scale applications, instead of the old conventional impellers.

The reactor is a mixing tank, in which the process solution is fed for the desired procedure. In addition to the impeller, the reactor generally includes flow tumblers attached to the walls.

The impeller is mainly used in arrangements where the process solution is solid substance, for example created as a result of precipitation. In this kind of operational environment, it is important that the mixing pattern is sufficiently strong throughout the whole reactor area, in order to agitate the solids so that they are not accumulated on the bottom, for instance.

In addition, it is necessary to create turbulence in the process, in order to make the reactions required by the process happen. In certain application environments, it is necessary to avoid excessive agitation power in the solids mixture, in order to prevent the breaking up of process elements, such as flocculants.

For example, the breaking up of solid particles created in precipitation, and of flocculants possibly used in the process, would strongly reduce the efficiency of the precipitation. When the precipitation efficiency is reduced, more and more flocculants must be added in the process in order to increase the efficiency, which further increases the expenses. The process solution is composed of for example an aqueous solution containing acid and substances dissolved therein. In addition, it is possible that gas is blown into the reactor, in case it is necessary for the reactions.

As possible process environments, there are suggested the precipitation of cobalt and nickel, production of lime milk, solution processes and large-scale sewage treatments. In a precipitation process, the metal is brought in the process solution for example by means of bulk leaching.

In a precipitation reactor, the metal is attempted to be precipitated in a process solution for example by blowing therein a gas, such as hydrogen sulphide. Now the metal contained in the solution begins to nucleate. When nuclei are created in the solution, they start to grow, and after surpassing a certain size, they can be separated from the process solution in thickening devices.

Generally known state of the art is represented by the patent publication U.S. Pat. No. 5,052,892 by Chemineer Inc. The described impeller element includes 2-4 blades, generally 3. The aim of the impeller is to minimize the power used for creating axial flow, so that the micromixing needed by the reactions need not be observed, and the aim is achieved by a smaller number of blades. The total edge of the impeller blades is small, i.e. 25-30 degrees, and the impeller blade blanks are rectangular in shape, i.e. the front and rear edges of the blades are in parallel.

According to the reference publication, the axial efficiency of the impeller is based on radial concavity, which is achieved by means of a diagonal fold. According to said reference publication, the blades are not attached to the impeller axis, but the blades are fastened by a bolt joint to a hub surrounding the axis, in which case the hub must be provided with protrusions to which the blades are attached to.

In an impeller according to the publication U.S. Pat. No. 5,052,892, the blade is provided with a bend line that is made in parallel with the blade edges, which bend line extends from the blade root to the tip and divides the blade in a front portion and a rear portion. The front portion of the blade is further provided with another bend line that extends diagonally from the tip of the first bend line to the front edge of the blade and ends at a distance that is roughly three quarters of the blade length, so that the end point of the bend line is at the distance of ¼ of the blade length from the hub. The angle of the first bend line is of the order 10-25°, and the angle of the second bend line is of the order 5-15°. In material, the blades are not uniformly thick throughout, but both their front and rear edges are chamfered in order to reduce the resistance. In the front edge of the blade, the chamfering is made on the upward side, and in the rear edge on the side underneath.

One of the drawbacks of the impeller described in the publication U.S. Pat. No. 5,052,892 is that it creates a powerful energy peak at the tip of the blades, i.e. agitation at the blade tips is very powerful. Thus the mixing effect is not distributed evenly in the reactor surrounding the impeller. The structure of the blades provided with chamfering requires several successive production steps.

OBJECT OF INVENTION

By using the novel impeller according to the invention, there is achieved a more even energy distribution and a larger wake area with turbulence, i.e. the energy distribution caused by the impeller in the reactor is more even than with the impeller described in the prior art. Thus there is created a gentle agitation, but at the same time one that is sufficiently efficient with respect to the reactions and the agitation of the solids.

In addition to good agitation properties, the design of the impeller according to the invention aims at realizing as good strength-technical properties as possible. In this way, there are achieved several benefits both as regards expenses and manufacture.

The object of an impeller according to the invention is to eliminate drawbacks of the impellers described in the prior art and of those already known in the field, and to introduce an impeller, to be used in hydrometallurgical processes, that is better, more energy efficient and more cost efficient.

SUMMARY OF INVENTION

The essential characteristics of the invention are apparent from the appended claims.

The invention relates to an impeller for agitating slurry created in a hydrometallurgical process in a reactor, which impeller is formed of at least five blades, each comprising the blade front edge, trailing edge, root and tip, so that the blade roots are permanently fastened by a joint to a hub or axis, and that the front edge of the impeller blade is straight, and the trailing edge is chamfered, in which case the blade is narrowed towards the tip, and the blade is provided with two longitudinal folds in parallel with the front edge of the blade.

According to a preferred embodiment of the invention, the folds that are in parallel with the front edge of the impeller blade are essentially at the same distance from each other and extend from the blade root to the blade tip.

According to a preferred embodiment of the invention, the folds that are in parallel with the front edge of the impeller blade divide the blade into three equally wide blade profiles, the area of which is reduced in the rotary direction of the blade.

According to a preferred embodiment of the invention, the impeller blade profiles are mutually different in surface area. According to a preferred embodiment of the invention, the front edge of the impeller blade is horizontal.

According to a preferred embodiment of the invention, the angle of the first fold of the impeller with respect to the horizontal plane is 15-25°. According to a preferred embodiment of the invention, the angle of the first fold of the impeller with respect to the horizontal plane is preferably 20°. According to a preferred embodiment of the invention, the angle of the second fold of the impeller with respect to the horizontal plane is 35-45°. According to a preferred embodiment of the invention, the angle of the second fold of the impeller with respect to the horizontal plane is preferably 40°.

According to a preferred embodiment of the invention, the angle α of the trailing edge of the impeller blade with respect to the blade front edge is 15-25°. According to a preferred embodiment of the invention, the angle α of the trailing edge of the impeller blade with respect to the blade front edge is preferably 20°.

According to a preferred embodiment of the invention, the front edge of the impeller blade is upwardly inclined. According to a preferred embodiment of the invention, the front edge of the impeller blade is downwardly inclined.

According to a preferred embodiment of the invention, the number of the impeller blades is 5-7. According to a preferred embodiment of the invention, the number of the impeller blades is preferably 5.

According to a preferred embodiment of the invention, the impeller blade is made of a plane with a homogeneous structure. According to a preferred embodiment of the invention, at least two impellers are arranged on the impeller axis.

According to a preferred embodiment of the invention, the impeller joint is a welded joint. According to a preferred embodiment of the invention, the impeller joint is made directly in the hub or the axis.

LIST OF DRAWINGS

DETAILED DESCRIPTION OF INVENTION

Figure 1:
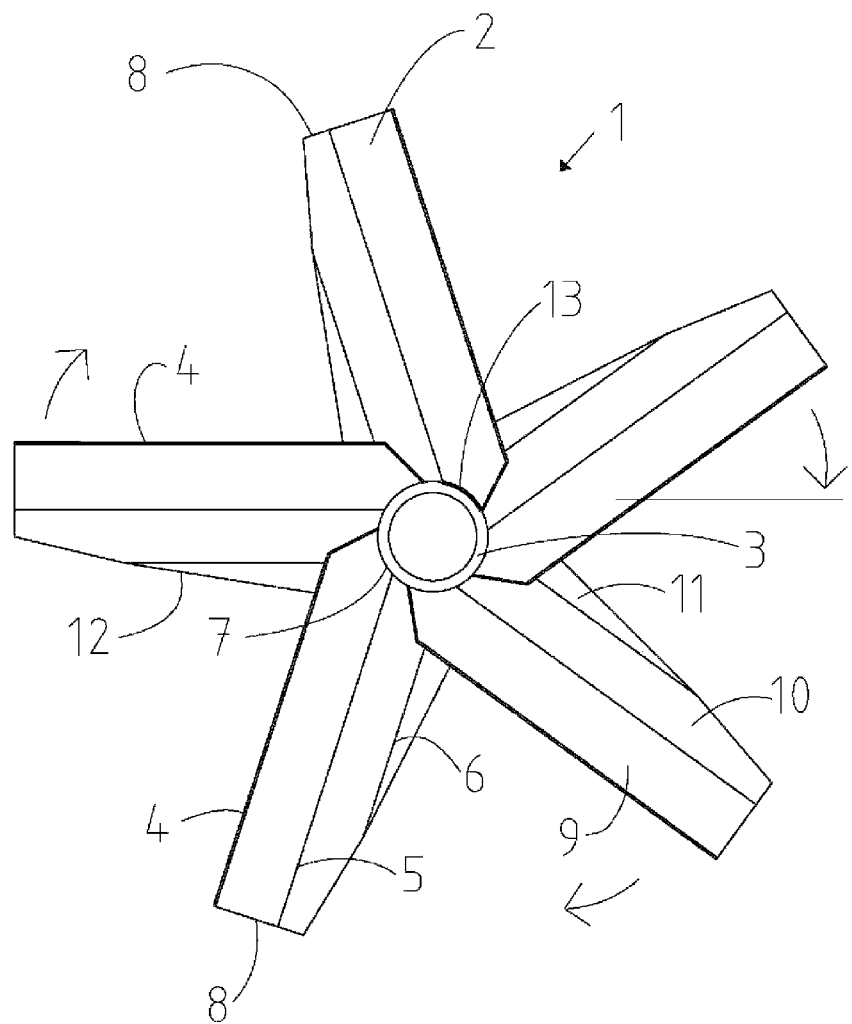
FIG. 1 is a top-view illustration of an impeller according to the invention.

The impeller of the invention is meant to be used for the same purpose as the conventionally known straight-bladed impellers of the field, and other known energy-efficient impellers of the field. The impeller according to the invention can be used for example in large arrangements, instead of the old conventional impellers.

With respect to the reactions taking place in a reactor, it is important that the impeller according to the invention forms a so-called wake area. In that way there is achieved a larger area for metallurgical reactions, which often require turbulence in order to take place.

It has been detected that by means of an impeller according to the invention, there is achieved, with respect to the prior art, a more even energy distribution and a larger wake area with turbulence, i.e. the energy distribution created by the impeller in the reactor is more even. The result is a gentle, but at the same time sufficiently efficient agitation for the reactions and the mixing of the solids.

In a basic impeller, represented for example by a so-called A-model impeller, provided with four straight blades, the agitation energy is strongly bound in the energy peaks created around the impeller blade. The Gaussian curve of the energy distribution of an impeller according to the invention has a remarkably lower gradient, because the aim has been to avoid the peaks.

An impeller according to the invention can be compared to an A-model impeller, where the angle of the impeller blades is 45 degrees. In the development of the new impeller, the aim has been to observe the phenomena taking place in a reactor as a whole, so that the object is a process result as good as possible. In addition to the amount of agitation created by the impeller, attention has been paid to the effects of the agitation in the reactions required by the ongoing process.

The total agitation of the process solution in the reactor, caused by the impeller, can be estimated by means of the degree of pumping caused by the impeller. Pumping here means the mobile liquid volume in the reactor at various height levels. When comparing an impeller according to the invention for example with a basic axial turbine known in the field, provided with four straight blades with an inclination of 45 degrees, a better pumping rate is achieved by an impeller according to the invention, by applying the same speed of rotation. The difference in the pumping rate of said impellers, with advantage to the impeller according to the invention, is largest in the bottom region, which is particularly important in the agitation of solids.

The impeller according to the invention is also suited for gas dispersion in a process solution, up to a certain limit, but it is not particularly designed for this purpose of usage. Here the term 'dispersion' means breaking up the gas to be fed in the reactor, in as small bubbles as possible, and distributing them as evenly as possible along the whole area of the reactor.

In addition to good mixing properties, the design of an impeller according to the invention also aims at strength-technical properties that are as good as possible. In this way, there are achieved advantages both with respect to expenses and to the manufacturing process.

The profile of an impeller according to the invention is realized by two parallel folds, which technique differs from the generally applied system of one fold, or a continuously changing profile (hydrofoil). In the impeller according to the invention, the impeller profile extends as long as the axis, and owing to this feature, there is achieved a natural rigidity.

The structural rigidity of an impeller according to the invention is about twenty times as high as that of a straight-bladed impeller. Even if the structure of a straight-bladed impeller is reinforced, the fatigue durability of the joint between the blade and the hub in a straight-bladed impeller always remains lower than that of an impeller according to the invention. Said joint is the most universal factor for defining the working life of the impeller. The rigidity of the structure reduces the extension of each stress cycle, which naturally prevents fatigue breakdown.

When comparing a straight-bladed impeller and an impeller according to the invention on different levels of the reactor, it was detected that by means of an impeller according to the invention, there is achieved the same pumping efficiency with a power consumption that is even 50% lower. This can be directly calculated as savings in operation expenses for the customer using the impeller. A more durable structure of the impeller also enables a longer working life and a lesser need for maintenance.

By using an impeller according to the invention, there are achieved savings in the manufacturing expenses. A lesser need of power enables the use of a smaller motor, and consequently perhaps the use of a lighter gearbox and a lighter structure for the impeller axis. It is also possible to arrange several new impellers according to the invention simultaneously on the same axis, because the impellers render an even agitation and enable a smooth flow.

The manufacture of an impeller according to the invention is cheaper than for example the manufacture of the impeller described in the prior art, because there is no need for a separate bracketed hub for the impeller axis.

Figure 2:
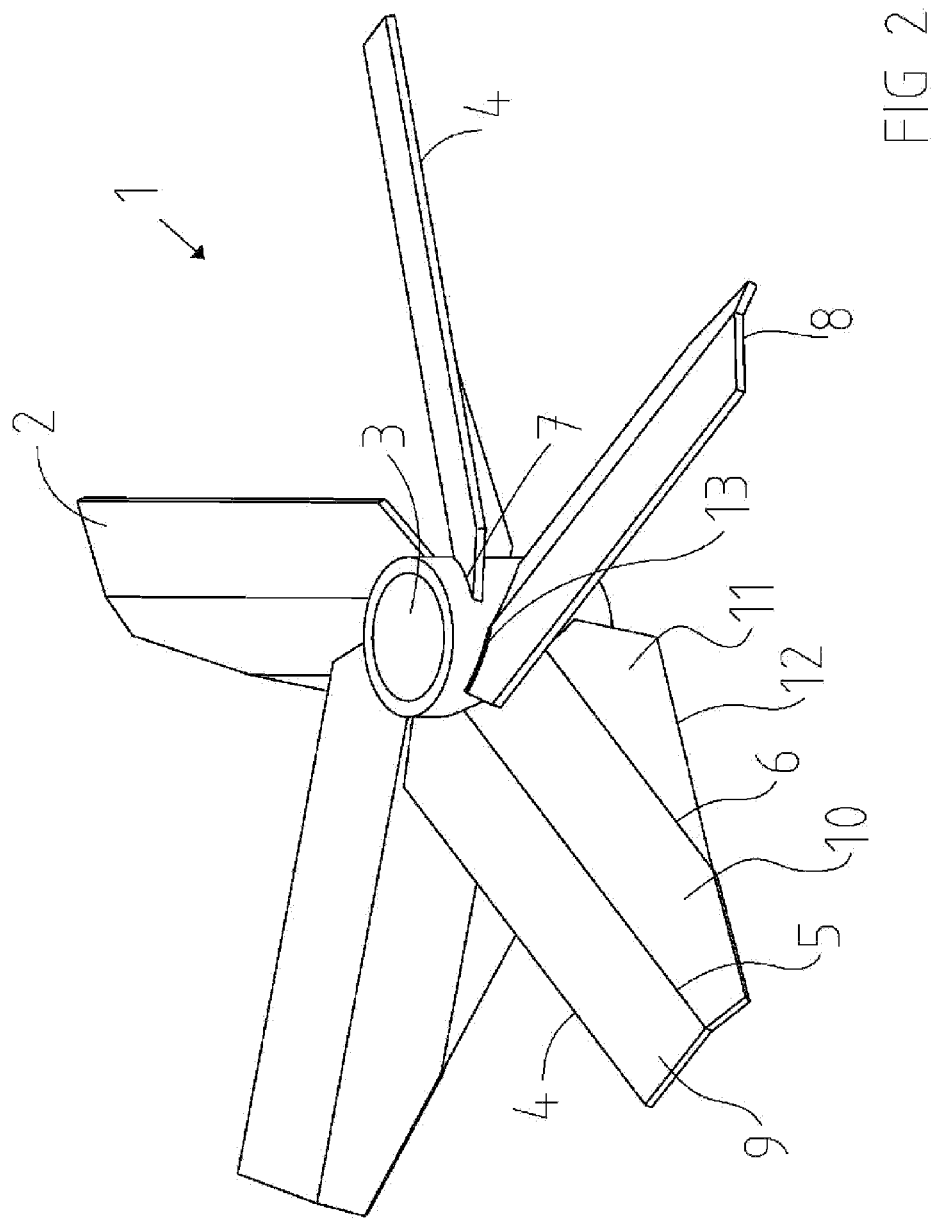
FIG. 2 is a three-dimensional side-view illustration of an impeller according to the invention.
Figure 3:
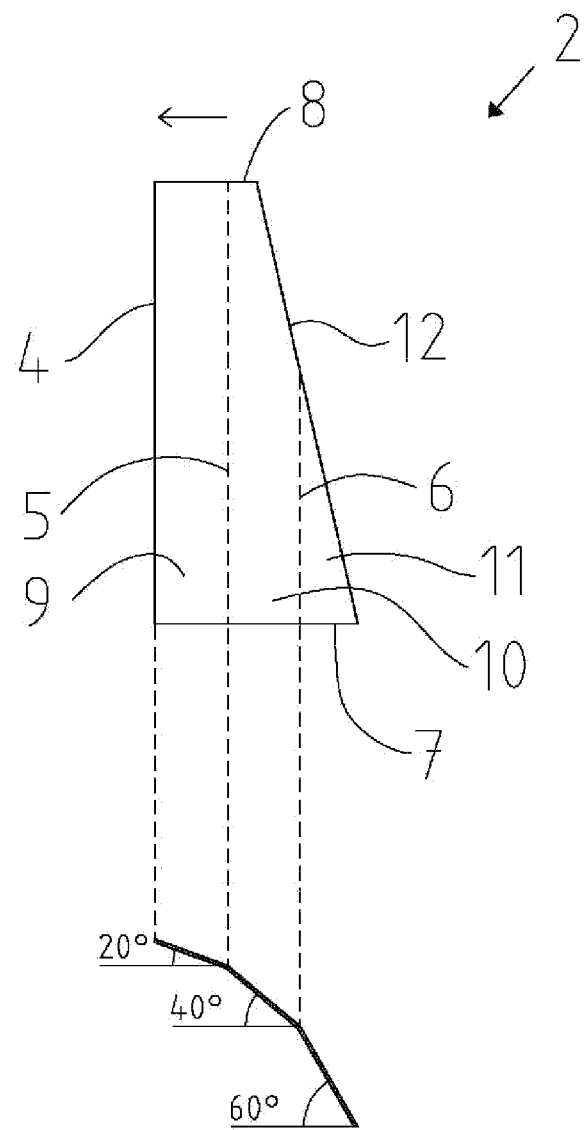
FIG. 3 is a top-view illustration of the blades of an impeller according to the invention, seen in an exploded view and in a horizontal cross-section.

As is apparent from FIGS. 1, 2 and 3, the impeller 1 according to the invention is formed of blades 2, which are fastened to the axis 3, or possibly by means of a hub (not illustrated in more detail). The joint 13 of the blades is made directly either in the axis or in the hub, without any brackets or a bolt joint. A typical way for realizing the junction is welding. Thus, the most generally applied ways for realizing said joint in the field are welding directly to the hub or axis, or a bolt joint to a bracket welded in the axis or hub. Basically an impeller according to the invention comprises as many blades as can be fastened to the axis, i.e. 5-7, preferably 5.

In an impeller according to the invention, the blade 2 is provided with two folds that are in parallel with the longitudinal direction on the blade, i.e. with the blade front edge 4, a first fold 5 and a second fold 6, which are located at essentially the same distance from each other and extend from the blade root 7 to the blade tip 8. The rounder the blade fold is, the better and more efficiently it functions in practice. The profile to be formed in the blade is made by these two folds, which divide the impeller blade into three profiles that are equal in width, the surface area of said blades, however, being reduced in the rotary direction of the blade. In a normal case, the blade front edge 4 is horizontal, and by means of folds, the blade is made to bend downwardly. The angle of each fold with respect to the horizontal plane is 15-25°, preferably 20°. When the blade front edge 4 is horizontal, the inclination of the first blade profile 9 of the blade is 15-25° from the front edge, the central inclination is approximately 20°, the inclination of the centermost blade profile 10 is of the order 35-45°, the central inclination being preferably 40°, and the inclination of the third blade profile 11 being of the order 55-65°, the central inclination being preferably 60° from the blade front edge. Now the whole central inclination of the blade is of the order 40°. The blade front edge 4 can also be inclined by a maximum of 10 degrees upwardly or downwardly, in which case the whole central inclination of the impeller, with respect to the horizontal plane, is of the order 30-50°, but with respect to the impeller front edge still of the order 40°.

From FIG. 3 it can be seen that the blade 2 of an impeller according to the invention is made of a plate with a homogeneous structure, and the front edge 4 of said plate, when viewed in the rotary direction, is straight, but the trailing edge, i.e. the rear edge 12, is chamfered so that the blade is narrowed towards the tip 8. The angle of the trailing edge with respect to the straight front edge is a, which is of the order 15-25°, i.e. the blade is trapezoid-shaped. The trailing edge 12 terminates at the blade tip 8 at the middle blade profile 10 as seen in FIGS. 1-3.

The tip of the blade is at right angles to the front edge, i.e. it is straight. The same applies to the blade root, but when necessary, it can be shaped in order to suitably fasten it to the axis 3. A homogeneous structure here means that the blade is not chamfered or otherwise shaped in the direction of the thickness. Because the trailing edge 12 is chamfered, it means that all blade profiles 9, 10 and 11 are different in size. The surface area of the first blade profile 9 is largest, and the surface area of the third profile 11 is smallest.

The fairly large total angle provided in the blade according to the invention essentially improves the structural rigidity of the impeller. Moreover, the blade is narrowed when proceeding from the axis 3, from the blade root 7 towards the blade tip 8. With a narrowing structure, energy is distributed more evenly, because the face area is reduced as the pitch line velocity increases.

In an impeller according to the invention, the characteristic features are not based on radial concavity. When both folds in an impeller according to the invention extend as far as the impeller axis, the structure becomes more rigid than in an impeller where the blades are fastened by means of bolts.

In an impeller according to the invention, the wear-resistance of the blade structure is based on blades that are permanently attached to an axis or a detachable hub. The natural rigidity is based on the fact that the center point of so-called inertia is shifted further from the fastening line, and the load per each blade is reduced, as the number of blades is increased.

An impeller 1 according to the invention aims at minimizing the power consumed for creating the axial flow, so that the micromixing needed by the reactions need not be taken into account, and thus the object of an impeller 1 according to the invention is also to ensure a sufficient reaction rate, i.e. it aims at securing the functional efficiency of the whole process, not only of the agitation step.

By means of an impeller 1 according to the invention, the Gaussian curve of the energy distribution has a remarkably lower gradient, because the aim has been to avoid the peaks. This is also described below and explained with reference to a separate example 1.

In processes where energy peaks break up flocculants, agglomerates or drops, the capacity for recovery of the product or waste to be separated from the process solution is essentially weakened. On the other hand, in processes where the reaction rate is proportional to the agitation energy up to a certain saturation point, energy is saved by using an impeller 1 according to the invention, because unnecessary energy peaks are not generated in the process, but the agitation energy is distributed as evenly as possible throughout the whole reactor volume.

EXAMPLES

Example 1

Figure 4:
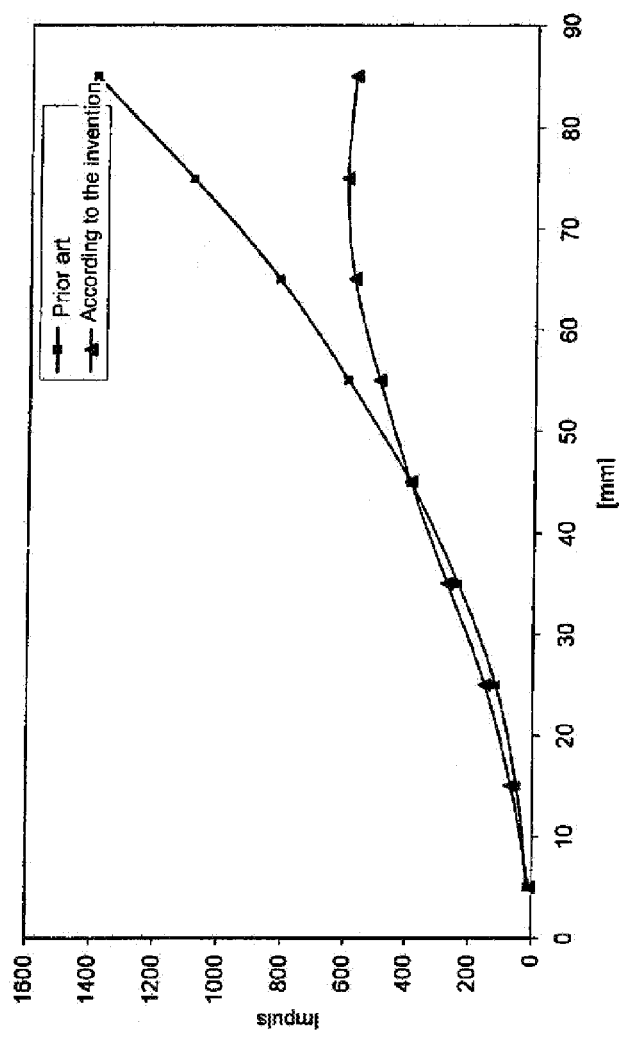
FIG. 4 is a graphical illustration of the impulse (agitation energy) of a prior art impeller and an impeller according to the invention with different distances from the impeller axis.

In FIG. 4, the impulse distribution, i.e. agitation energy distribution, of an impeller according to the invention is compared with that of an impeller according to the prior art (U.S. Pat. No. 5,052,892) by means of graphic diagrams. In the diagrams, there is calculated the impulse given by the impeller blade with different distances from the impeller axis, when the maximum length of the blade is 85 mm.

In the diagrams, the employed surface area of the impeller blades has been one and the same in each case. From the diagrams it can be seen that the impulse given by a prior art impeller blade is very strong at the blade tip, whereas in an impeller according to the invention, the impulse is remarkably more even along the whole length of the blade. When there is desired an even agitation into the reactor, the model of the impeller blade according to the invention is clearly more advantageous than the one described in the prior art.

The invention claimed is:

1. An impeller for mixing slurry, created in a hydrometallurgical process, in a reactor, said impeller being formed of at least five blades, each comprising a blade front edge, trailing edge, root and tip, so that the roots of the blades are permanently attached by a joint to a hub or an axis, wherein the front edge of the impeller blade is straight, and the trailing edge is chamfered, so that the blade is narrowed towards the tip, and that the blade is provided with two longitudinal folds arranged in parallel with the blade front edge and said folds are located at the same distance from each other, and extend from the blade root to the blade tip and divide the blade in three equally wide blade profiles, the surface area of which is reduced in the rotary direction of the blade, wherein the trailing edge terminates at the blade tip at a middle blade profile of the three blade profiles.

2. An impeller according to claim 1, wherein in surface area, the blade profiles are mutually different.

3. An impeller according to claim 1, wherein the front edge of the impeller blade is horizontal.

4. An impeller according to claim 1, wherein the angle of the first fold with respect to the horizontal plane is 15-25°.

5. An impeller according to claim 1, wherein the angle of the first fold with respect to the horizontal plane is 20°.

6. An impeller according to claim 1, wherein the angle of the second fold with respect to the horizontal plane is 35-45°.

7. An impeller according to claim 1, wherein the angle of the second fold with respect to the horizontal plane is 40°.

8. An impeller according to claim 1, wherein the angle $\alpha$ of the trailing edge of the blade with respect to the front edge of the blade is 15-25°.

9. An impeller according to claim 1, wherein the angle $\alpha$ of the trailing edge of the blade with respect to the front edge of the blade is 20°.

10. An impeller according to claim 1, wherein the front edge of the blade is inclined upwardly.

11. An impeller according to claim 1, wherein the number of the blades in the impeller is 5-7.

12. An impeller according to claim 1, wherein the number of the blades in the impeller is 5.

13. An impeller according to claim 1, wherein the blade of the impeller is made of a plate with a homogeneous structure.

14. An impeller according to claim 1, wherein the joint is a welded joint.

15. An impeller according to claim 1, wherein the joint is made directly in a hub or an axis.

* * * * *